US007197656B2

United States Patent
Nguyen et al.

(10) Patent No.: US 7,197,656 B2
(45) Date of Patent: Mar. 27, 2007

(54) PROVIDING OVERLOAD PROTECTION IN BATTERY OPERATION

(75) Inventors: Don J. Nguyen, Portland, OR (US); John Deignan, Tigard, OR (US); Dan J. Lenehan, Los Altos Hills, CA (US)

(73) Assignee: Intel Corporation, Santa Clara, CA (US)

( * ) Notice: Subject to any disclaimer, the term of this patent is extended or adjusted under 35 U.S.C. 154(b) by 542 days.

(21) Appl. No.: 10/155,208

(22) Filed: May 24, 2002

(65) Prior Publication Data

US 2003/0221133 A1    Nov. 27, 2003

(51) Int. Cl.
G06F 1/28    (2006.01)
(52) U.S. Cl. .................... 713/340; 713/320
(58) Field of Classification Search ............ 713/300, 713/320, 321, 323, 324, 340; 320/134, 136
See application file for complete search history.

(56) References Cited

U.S. PATENT DOCUMENTS

| 5,341,503 | A | * | 8/1994 | Gladstein et al. | ........... 713/340 |
| 5,349,668 | A | * | 9/1994 | Gladstein et al. | ........... 713/340 |
| 5,423,045 | A | * | 6/1995 | Kannan et al. | ............ 713/322 |
| 5,752,046 | A | * | 5/1998 | Oprescu et al. | ............ 713/300 |
| 5,784,629 | A | * | 7/1998 | Anderson et al. | .......... 713/340 |
| 5,920,728 | A | * | 7/1999 | Hallowell et al. | .......... 713/340 |
| 5,978,921 | A | * | 11/1999 | Ryu | ............................ 713/300 |
| 6,167,524 | A | * | 12/2000 | Goodnow et al. | .......... 713/300 |
| 6,266,776 | B1 | * | 7/2001 | Sakai | .......................... 713/300 |
| 6,353,894 | B1 | * | 3/2002 | Pione | ......................... 713/340 |
| 6,687,839 | B1 | * | 2/2004 | Tate et al. | .................. 713/324 |

OTHER PUBLICATIONS

"Mobile Power Guidelines 2000", Revision 1.0, Dec. 11, 1998; Intel Corporation.

* cited by examiner

Primary Examiner—Thuan Du
(74) Attorney, Agent, or Firm—Ted A. Crawford (57) ABSTRACT

For a battery-operable device, an overload protector may prevent a catastrophic malfunction. Using the overload protector, a power source may enable controlled delivery of power to the battery-operable device as a result of a timely intervention. More particularly, in mobile devices or systems with variable power consumption components and/or operational modes, the frequency of the occurrence of tripping in a battery may be reduced or even eliminated in some cases. In one embodiment, a battery overload protector may continuously monitor available power from a power delivery unit and alert a processor-based system before a threshold of available power is reached by tracking power consumption against the threshold. The battery overload protector may issue a warning to the processor-based system in order to avoid exceeding the threshold. Responsive to the warning, one or more power conserving tasks may be initiated in the processor-based system, controllably consuming available power without reaching the threshold.

24 Claims, 5 Drawing Sheets

PROVIDING OVERLOAD PROTECTION IN BATTERY OPERATION

BACKGROUND

The present invention relates in general to power sources that deliver power to battery-operable devices, and more particularly, to a power delivery unit capable of providing an overload protection while operating an associated system with variable power consumption components and/or operational modes.

For battery-operable devices, among other design constraints related to the size and cost, power consumption and battery life is a significant design constraint. In a mobile environment, for example, performance of a portable device may depend upon the rate of power consumption, translating into the duration of available battery life. Low-power design techniques coupled with other power saving strategies may extend battery life.

However, providing an overload protection while operating an associated system with variable power consumption components and/or operational modes that demand higher power consumption, ensuring extended battery life may be difficult. Even worse, as power consumption increases, the battery life of mobile devices or systems decreases, leading to less attractive consumer products.

Managing power usage by hardware components and/or software applications in a system to keep overall power consumption within limits may be difficult. One reason for this difficulty is that conventional smart battery pack solutions that monitor power at regular intervals fail to quickly take appropriate corrective measures. Therefore, delivering higher performance while still maintaining a good battery life and providing overload protection presents significant challenges especially in mobile platforms.

Typically, a battery may be used in conjunction with an alternating-current/direct-current (AC/DC) adapter to power a system. For example, a conventional notebook computer may include the AC/DC adapter to source power and recharge the battery at the same time with available power from a power outlet. When an over-current protection (OCP) circuit having a trip point detects an over-current condition, the battery may need to be stopped immediately from sourcing current to the notebook computer.

Often high-performance notebook computers comprise a high-performance processor, a large display panel, a large storage-capacity drive (sometimes multiple drives), a compact disk read only memory (CD-ROM), and a digital versatile drive (DVD), each demanding high-power drain from a battery pack having one or more batteries. When fully operational and displaying high-performance applications that may require the processor to perform numerous simultaneous, computations, or operations, such as data reading and writing to the drives, and information displaying at very high luminance level, the total power drain from the battery pack may reach a maximum allowable power envelope. At a low-battery condition, such as when the battery pack is nearing its discharged state, the demand for current from the battery pack may be higher than that of the trip point. This may cause the system to shutdown. This is a problem because valuable data may not have been saved in time before an improper system shutdown occurred.

Figure 4A:
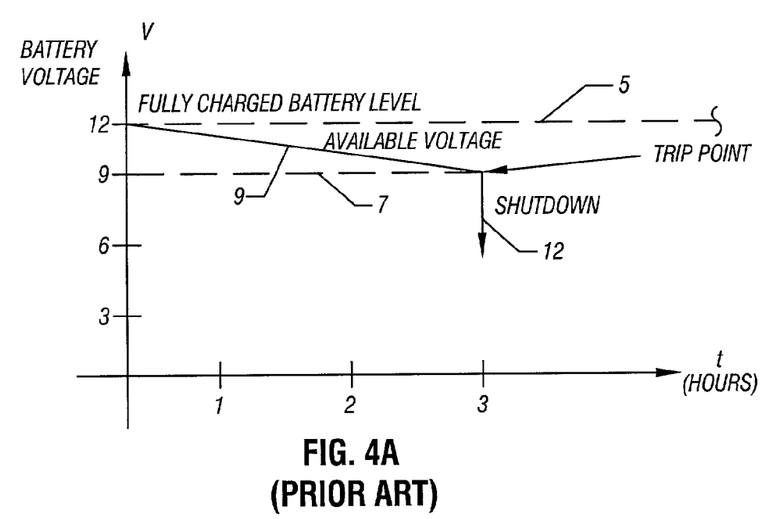
FIG. 4A is a hypothetical graph of the battery voltage versus time for a conventional power delivery unit.

A hypothetical graph of the battery voltage versus time for a conventional power delivery unit is shown in FIG. 4A. A fully charged battery level 5 for a battery employed in a power delivery system is shown at 12 volts of battery voltage. Likewise, a predetermined battery trip point 7 is indicated at 9 volts of battery voltage. A hypothetical graph of an available voltage 9 is shown with respect to time, because generally the battery voltage decreases over time with usage. In operation, once a system powered by the battery reaches the predetermined battery trip point 7, an unexpected shutdown 12 may result. Without having an ample opportunity to properly power down the system, the unexpected shutdown 12 may result, for example, in catastrophic loss of data.

Thus, better overload protection is desirable in battery operation to reduce system malfunctions.

DETAILED DESCRIPTION

Figure 1:
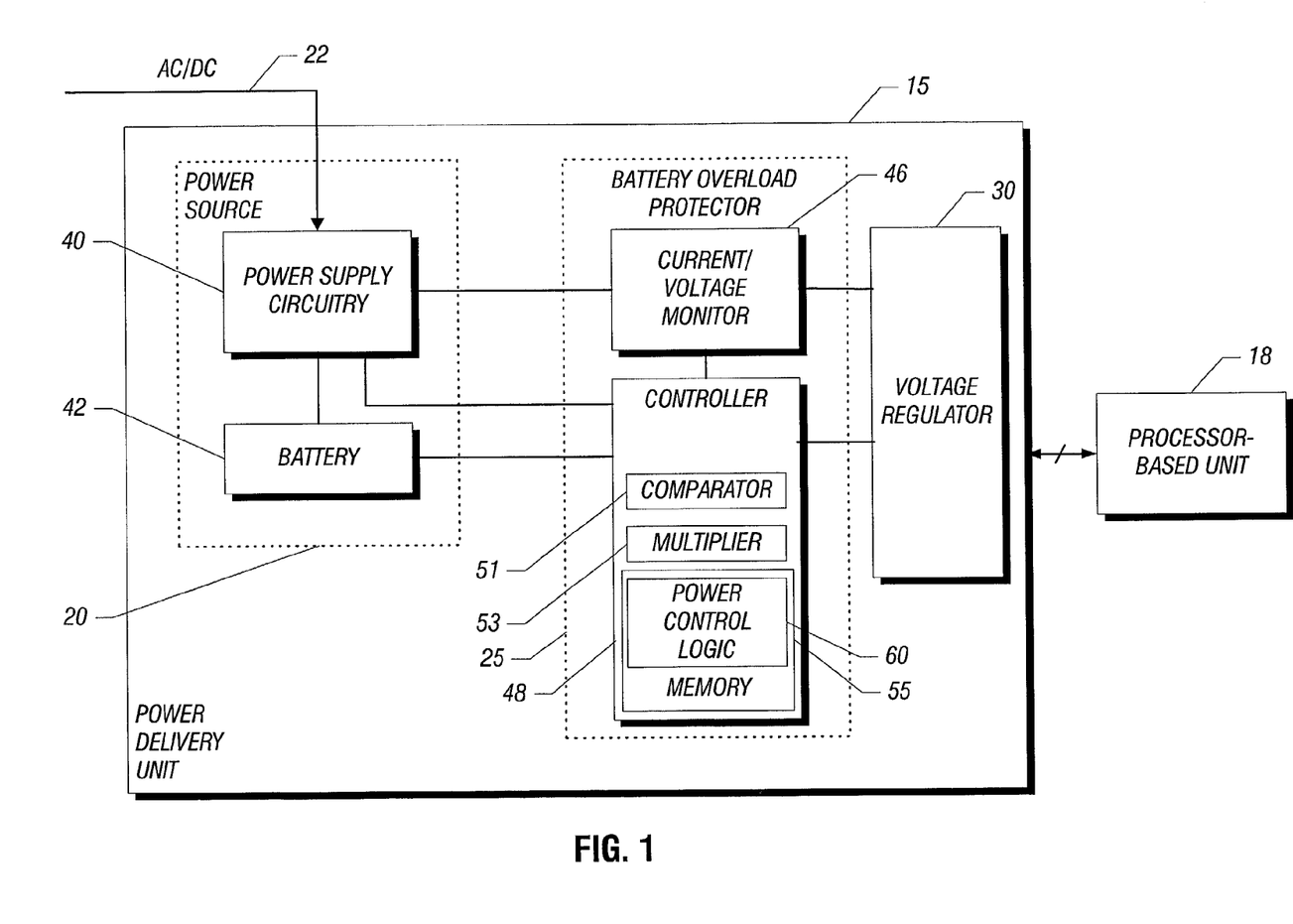
FIG. 1 is a block diagram of a processor-based system including a power delivery unit for delivering power to a processor-based unit, in accordance with one embodiment of the present invention.

A power delivery unit 15 as shown in FIG. 1 may be electrically coupled to a processor-based unit 18 for controllably furnishing power using at least one of an internal source of power and an external source to provide effective overload protection. To deliver power, the power delivery unit 15 may comprise, in one embodiment, a power source 20, which may receive an AC/DC signal 22. The power delivery unit 15 may further include a battery overload protector 25 to selectively energize all or some portions of the processor-based unit 18 at a desired power level. For example, relatively power hungry components of the processor-based unit 18 may be placed in a low performance state (e.g., a relatively lower power consuming state than normal operation) in one embodiment based on current levels of power consumption by the processor-based unit 18. Accordingly, the battery overload protector 25 may avoid overloading of the power delivery unit 15. In one case, this may prevent catastrophic malfunctioning in the processor-based unit 18.

Examples of the processor-based unit 18 may include mobile systems, such as notebook computers and wireless devices, such as personal digital assistants (PDAs). Any portable or hand-held device that is battery-operated may also be powered by the power delivery unit 15. Before applying available power to the processor-based unit 18, the power delivery unit 15 may regulate the available power being delivered. To this end, the power delivery unit 15 may further include a voltage regulator 30 in accordance with one embodiment of the present invention.

According to one embodiment of the present invention, available power from the power source 20 may be continuously monitored instead of being sampled only at certain fixed intervals. Before a threshold of available power is reached, the processor-based unit 18 associated with the power source 20 may be alerted to undertake timely evasive measures without jeopardizing a loss of useful data or a communication link, for example. To avoid reaching the threshold, one or more power conserving tasks may be initiated in the processor-based unit 18 in some embodiments. While power consumption by the processor-based unit 18 may be linearly tracked against the threshold, an appropriate warning may be issued to the processor-based system 18 depending upon the status of current power consumption that is monitored or measured, essentially avoiding reaching the threshold. In turn, the available power at the processor-based unit 18 may be dissipated based on the warning.

A rate of current power consumption by the processor-based unit 18 of the available power from the power source 20 may be determined according to one embodiment of the present invention. Then, a rate of decline for the available power may be estimated to adjust the rate of current consumption at the processor-based unit 18 to protect the power source 20 from overloading. Feedback indicative of a steady state power may be received from the power source 20 to avoid the threshold. Dynamically, the rate of current power consumption of the available power may be modified based on such feedback. By continuously detecting a real-time power transient in the power source 20, a malfunction may be prevented in the processor-based unit 18. In this way, a catastrophic shutdown of the processor-based unit 18 may be either completely avoided or controllably carried out as a result of a timely intervention in some situations according to one embodiment of the present invention.

To energize the processor-based unit 18 that may include one or more components, the power delivery unit 15 may dynamically track power consumption by the processor-based unit 18 against a predetermined power drain level. In response to the power consumption reaching the predetermined power drain level, at least one power conserving task may be performed in real-time by the processor-based unit 18. Such a power conserving task may adjust the power consumption to an acceptable level. The power source 20 may operate a mobile device that includes a processor and a display according to one embodiment of the present invention. By slowing down the processor and/or dimming the display in the mobile device, the power source 20 may be prevented from reaching a battery overload situation without providing a sufficient notice to intervene.

The power source 20 may further comprise power supply circuitry 40 that is electrically coupled to a battery 42 in one embodiment. Likewise, the battery overload protector 25 may include a current-voltage monitor 46 to track the output from the power supply circuitry 40. In addition, the battery overload protector 25 may comprise a controller 48 to enable adjustment of the power consumption in the processor-based unit 18. By alerting the processor-based unit 18 of a current power consumption level, an overload protection mechanism may be provided in some embodiments. The controller 48 may include a comparator 51, a multiplier 53 and a memory 55, storing a power control logic 60 to implement such an overload mechanism in some cases, for example.

The current-voltage monitor 46 may sense the current and voltage at the battery 42, which may have a battery trip point associated therewith, e.g., a condition indicative of a critical battery overload. The controller 48 may manage power distribution based on the sensed current and voltage from at least one of the power supply circuitry 40 and the battery 42. Moreover, the controller 48 may be at least one of hardware, software, and firmware in some embodiments.

In operation, the power source 20 may be provided with a battery overload condition. The current-voltage monitor 46 may monitor the current and voltage at the power source 20 to estimate in advance a potential occurrence of the battery overload condition for the power source 20. The multiplier 53 may multiply the current and voltage, to derive a power usage indication from one or more components of the processor-based unit 18. The comparator 51 may compare the power usage indication with the predetermined power drain level so that at least one component of the processor-based unit 18 may be selectively deenergized in order to avoid exceeding the battery overload condition. For example, before the power usage indication exceeds the predetermined power drain level, a selected component of the processor-based unit 18 may be placed into a lower-power consuming state with respect to other components that may remain operational at a normal level which may be a relatively higher-power consuming state.

The power control logic 60 may estimate when the battery trip point will occur for the battery 42, and prepare the processor-based unit 18 for a proper shutdown, if it becomes inevitable or otherwise desired, before reaching the battery trip point. The power control logic 60 may be responsible for tracking power consumption of the processor-based unit 18 and determining how much of the available power is left to dissipate from the battery 42 based on the current levels of power consumption.

Another embodiment of the present invention includes a power delivery device to controllably energize a processor-based system that includes one or more components. The power delivery device may comprise circuitry that receives a line signal (e.g., an AC power) to supply power. While in a first mode, power delivery device may use the line signal for supplying a DC power signal to the processor-based system. Otherwise, while in a second mode, a battery pack with an associated tripping point coupled to the circuitry may supply the DC power signal to the processor-based system.

Figure 2:
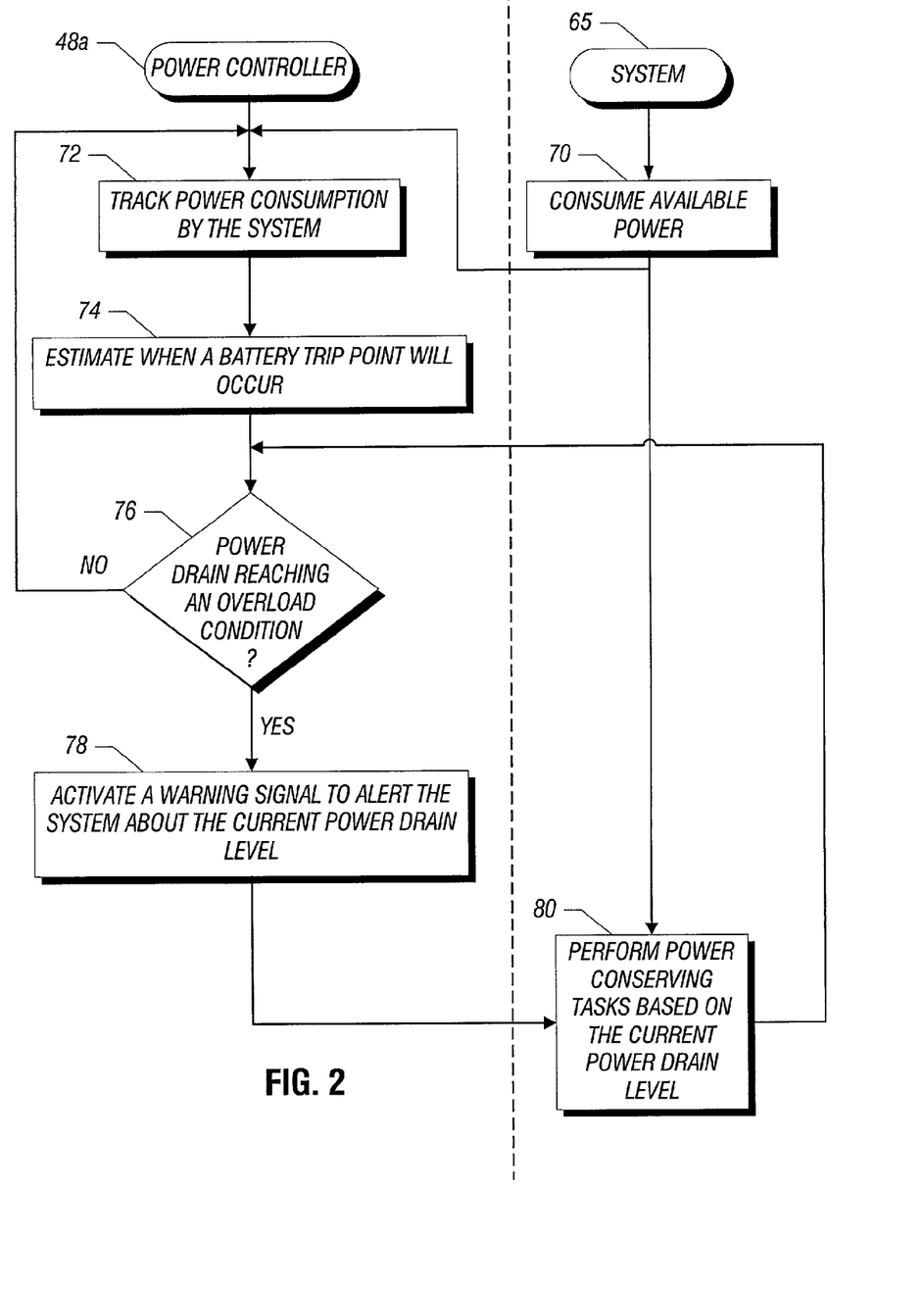
FIG. 2 is a flow chart of interaction between a power control logic and the system of FIG. 1 according to one embodiment of the present invention.

Power control software 48a is shown in FIG. 2 for managing power consumed by a system 65 while running one or more software applications and/or hardware subsystems. The power control software 48a analyzes power consumption of the entire system 65 to determine whether or not certain software applications and/or hardware subsystems may be either completely shut off, or alternatively switched into another operational state so that power may be consumed within power budgets.

Consistent with one embodiment of the present invention, a battery threshold, and an overload condition may be provided for the power control software 48a. At block 70, the system 65 may consume available power that is made available in real-time. In order to monitor the available power, the power control software 48a may track the power consumption by the system 65 at block 72. Based on the power consumption of the system 65, a potential tripping of the battery 42 of FIG. 1 may be estimated at block 74. A check at diamond 76 determines whether the power drained by the system 65 is reaching the overload condition that may surpass the battery threshold. If not, the power control software 48a continues to track the power consumption by the system 65 without adjusting the power consumption. Alternatively, a warning may be activated to alert the system 65 about the current power drain level at block 78. In response to the warning, the system 65 may initiate a power conserving task based on the current power drain level at block 80.

Figure 3:
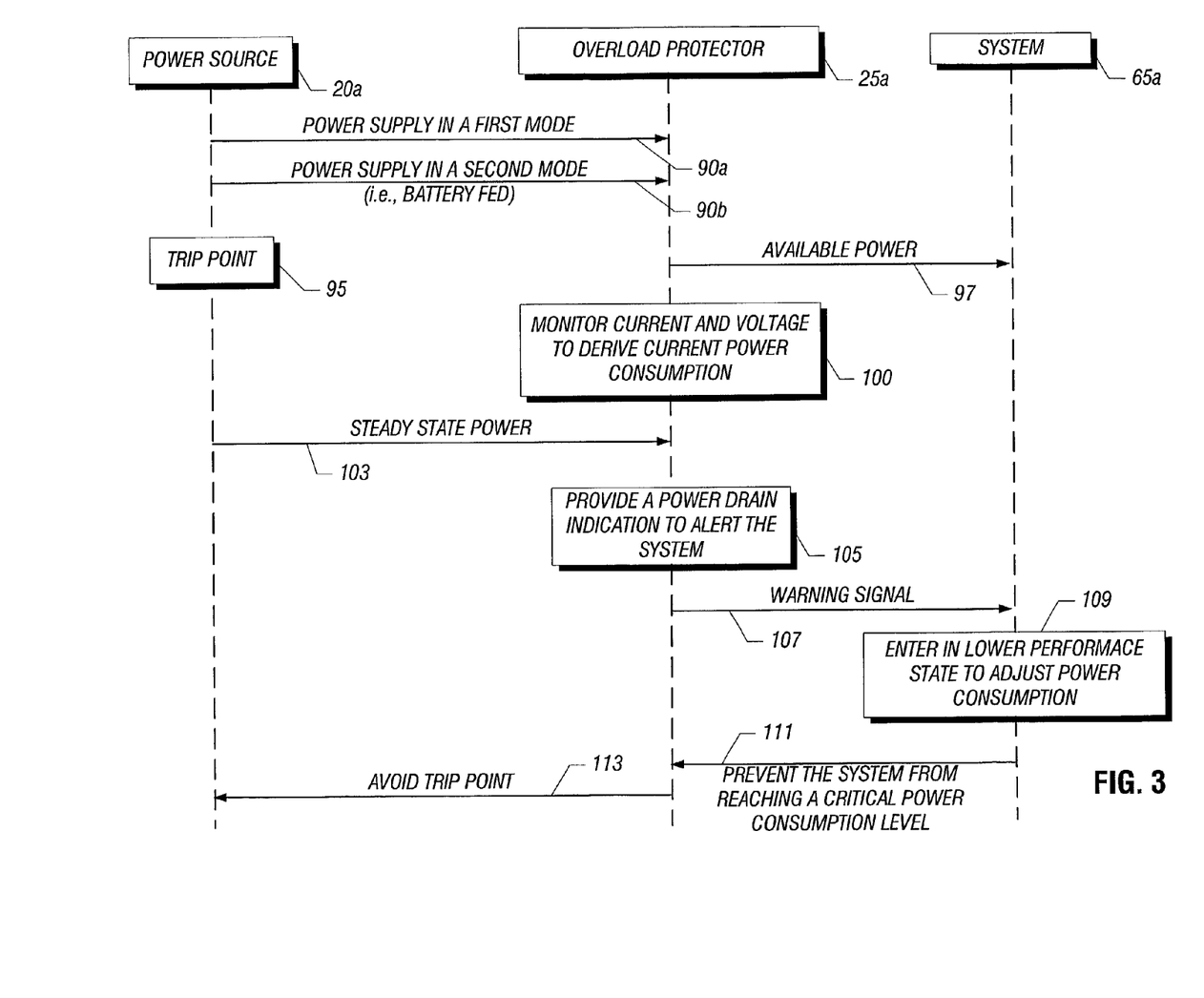
FIG. 3 is a schematic depiction an interaction between the power source, overload protector, and the system of FIG. 1 consistent with one embodiment of the present invention.

An interaction between a power source 20a, an overload protector 25a, and a system 65a is shown in FIG. 3. The power source 20a may supply power to the overload protector 25a either in a first mode 90a or in a second mode 90b (i.e., battery fed) in some embodiments. The battery 42 (FIG. 1) may have a trip point 95, indicating when a malfunction may result because of an over the limit power drain. Using the power supplied from the power source 20a, the overload protector 25a may provide available power 97 to the system 65a.

While delivering the available power 97 to the system 65a, the overload protector 25a may monitor the current and voltage on the output from the power source 20a (block 100) to derive a current power consumption level. The power source 20a may continuously provide a steady state power indication 103 to the overload protector 25a, which may track the current power consumption level against a predetermined threshold level of the available power 97.

When the predetermined threshold level is about to be reached, a high power drain indication may be provided at block 105 to alert the system 65a. To this end, a warning signal 107 may cause the system 65a to enter in a low performance state by adjusting the current power consumption level at block 109. This may prevent the system 65a from reaching a critical power consumption level, i.e., the overload condition, as indicated by an arrow 111. In turn, this may avoid reaching the trip point 95 of the battery 42 as indicated by an arrow 113.

Figure 4B:
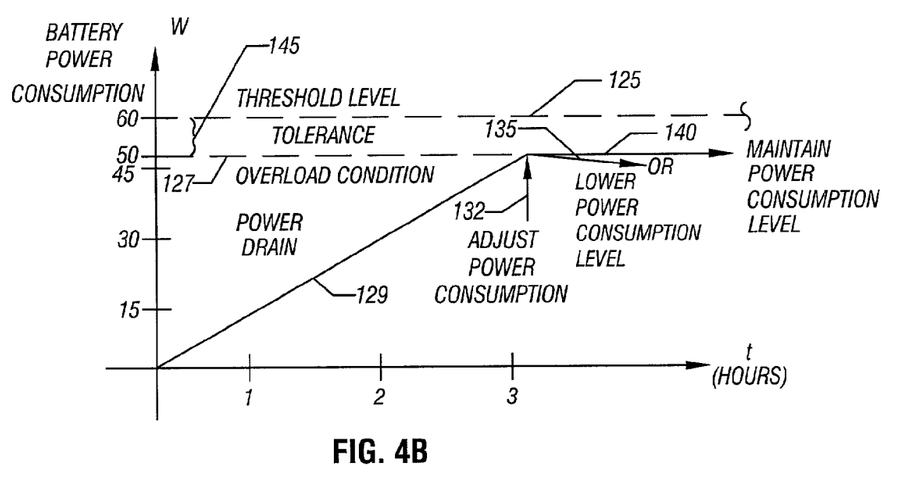
FIG. 4B is a hypothetical graph of the battery power consumption versus time for a power delivery unit in accordance with one embodiment of the present invention.

A hypothetical graph of battery power consumption versus time is shown in FIG. 4B for the power delivery unit 15 (FIG. 1) deployed in a mobile device, as an example, according to one embodiment of the present invention. The battery 42 (FIG. 1) may have an associated threshold level of 125 (e.g., 60 Watts). Although the threshold level 125 may vary according to a particular battery pack design, an overload condition 127 may be derived based on a particular application. When desired, the overload condition 127 (e.g., 50 Watts) may be preselected, additionally or alternatively may be programmably changed to provide a warning indication (e.g., the warning signal 107 of FIG. 3). The warning indication may alert the system 65a that power drain 129 may exceed the overload condition 127. The system 65a may use the warning indication to slow itself down for reducing the power drain 129, in turn, preventing it from actually reaching the threshold level 125.

For the purposes of slowing down or selectively powering down, the system 65a may perform several tasks to adjust power consumption to a sustainable level, as shown by an arrow 132. More specifically, by initiating one or more power conserving tasks, the system 65a may lower the power consumption as indicated by an arrow 135, or alternatively may maintain the power consumption as illustrated by an arrow 140. In any event, one or more software applications and/or one or more hardware subsystems may be commanded to transition from a high or normal performance state to a lower performance state (e.g., a lower-power consuming state). For example, by reducing operative frequency or changing the operational state, a central processing unit (CPU) may be throttled. Additionally, or alternatively, other associated components of the system 65a may be either slowed down, transitioned to a lower-power consuming state, or completely shut down, in one case.

As shown in FIG. 4B, a tolerance 145 (e.g., 10 Watts) may enable the system/battery to provide a real-time adjustment of the power consumption. However, the tolerance 145 may be varied depending on a system and/or a battery pack design. That is, depending on a particular implementation, an appropriate tolerance level may be devised.

According to one embodiment of the present invention, a system including the processor-based unit 18 of FIG. 1 may comprise one or more components, such as a battery-driven processor. Examples of the system include computing, communicating, wireless, and wireline architectures, platforms or configurations that may be battery-operable. Moreover, such system may include a power supply (e.g., comprising the power delivery unit 15 of FIG. 1) having a conventional adapter and a conventional battery pack operably coupled to the battery-driven processor to deliver available power. While in a first mode, an AC/DC signal may be received to supply the available power to the battery-driven processor and the one or more components of the system. Conversely, in a second mode opposite that of the first mode, the battery coupled to the conventional adapter may supply the available power. The system may further include a system power controller operably coupled to both the conventional adapter and the conventional battery pack to receive the available power and a conventional regulator to selectively energize the one or more components of the system from the available power. Although many variations of the processor-based unit 18 and the power delivery unit 15 are contemplated, an example consistent with one embodiment of the present invention is generally described herein.

Figure 5:
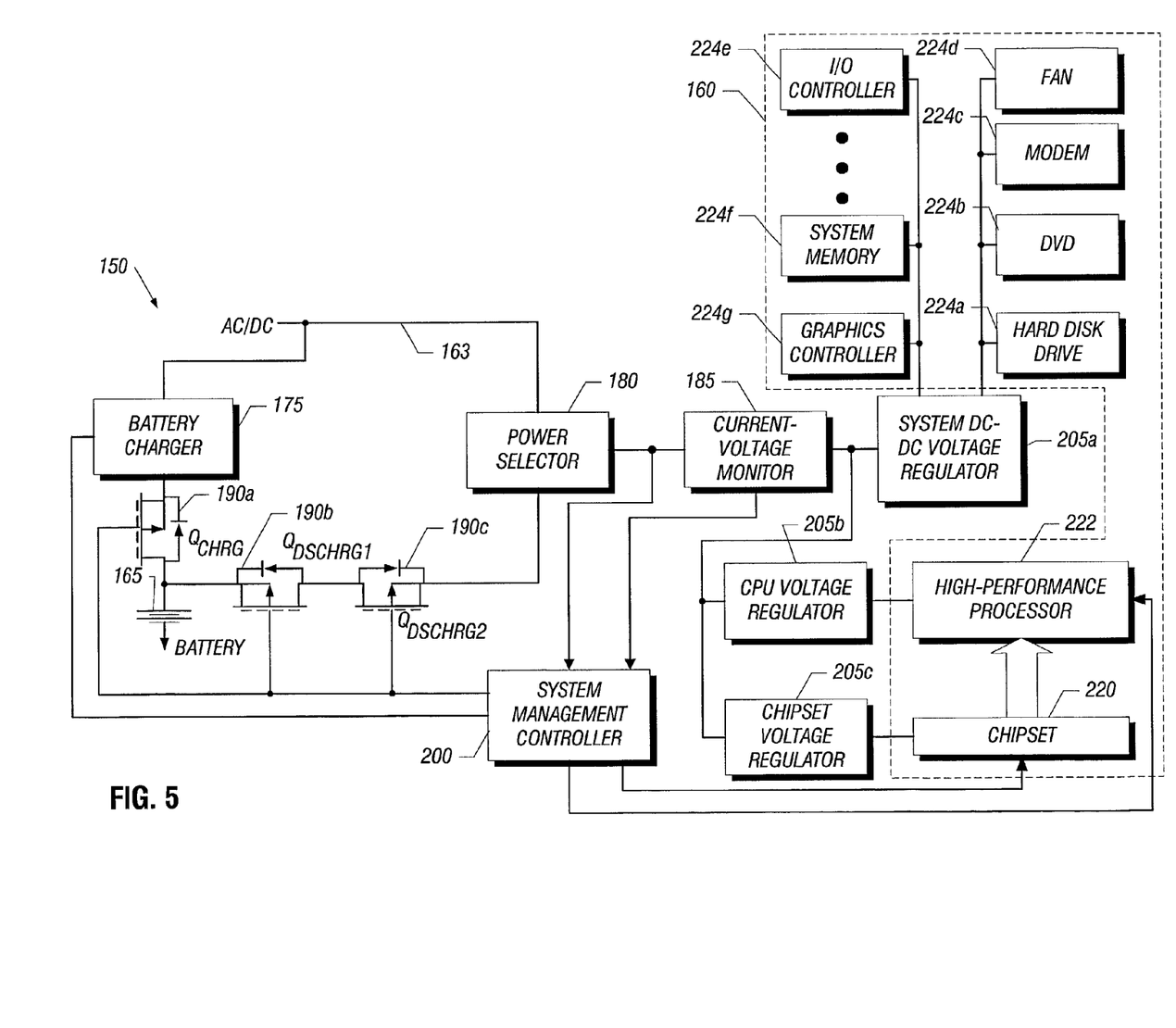
FIG. 5 is a block diagram of a mobile computing platform where a power delivery system may be deployed for a mobile device in accordance with one embodiment of the present invention.

A power delivery system 150 is shown in FIG. 5 for delivering power to a mobile system 160 in one embodiment. For this purpose, an AC/DC signal 163 may be received at the power delivery system 150. In case the power needs to be supplied to the mobile system 160 in the absence of the AC/DC signal 163, a battery unit 165 may be included. The power delivery system 150 may further include a battery charger 175 to charge the battery through the AC/DC signal 163. For providing an arbitration mechanism between the AC/DC signal 163 and the power provided by the battery unit 165, a power selector 180 may be included in some embodiments. A current-voltage monitor circuit 185 may further be provided to continuously track the output of the power selector 180 in order to monitor the current power consumption level by the mobile system 160.

In the embodiment shown in FIG. 5, the battery unit 165 may get charged through a metal-oxide silicon field effect transistor (MOSFET) $Q_{CHRG}$ 190a coupled between the battery charger 175 and the battery unit 165. However, when powering the mobile system 160, the battery unit 165 may discharge through a pair of two back-to-back MOSFETs, $Q_{DSCHRG1}$ 190b, and $Q_{DSCHRG2}$ 190c via the discharge path from the battery unit 165 to the power selector 180. The primary purpose of the power selector 180 is to select whether the battery unit 165 or an AC/DC adapter (not shown) is to power the mobile system 160. For instance, most notebook computers are designed to have such an AC/DC adapter for simultaneously sourcing power and recharging an associated battery pack when plugged into a power outlet. Although this embodiment describes the case where only the battery unit 165 is powering the mobile system 160, however, the present invention is not so limited as it applies to a situation where only the AC/DC adapter is plugged in to deliver the power to the mobile system 160.

The power delivery system 150 may further include a system management controller 200 to receive an indication of the current power consumption level and to derive a warning signal based on the status of the current power consumption level. To regulate the power being provided to the mobile system 160, a system AC/DC voltage regulator 205a, a CPU voltage regulator 205b, and a chipset voltage regulator 205c may be provided in the power delivery system 160.

The mobile system 160 may include a chipset 220, a high performance processor 222, and an associated functionality including hardware subsystems, software applications, and firmware. More specifically, a hard disk drive 224a, a digital versatile disk (DVD) 224b, a modulator-demodulator (MODEM) 224c, a fan 224d, an input/output (I/O) controller 224e, a system memory 224f and a graphics controller 224g may be included in some embodiments of the present invention.

In operation, if an overload condition is detected in the current-voltage monitor circuit 185 that may lead to tripping the battery unit 165 by driving the $Q_{DSCHRG1}$ 190b and $Q_{DSCHRG2}$ 190c MOSFETs to an off state, the system management controller 200 issues a timely warning to the mobile system 160 in real-time. This warning may avoid stopping the battery unit 165 from sourcing current to the mobile system 160 by performing appropriate power conserving tasks as described earlier and several examples thereof are set forth below.

One example of these power conserving tasks include reducing clock speed of the high-performance processor 222, such as from 1 Giga Hertz (GHz) to 500 Mega Hertz (MHz), significantly decreasing power consumption by the mobile system 160, for example by 10 Watts. In another example, the graphics controller 224g may dim a display to a relatively lower illumination level, again conserving a substantial amount of power. In addition, the hard disk drive 224a, or the DVD 224b may be instructed to slow down the spinning speed of the disk, reducing power consumption by at least few Watts, for example.

While the present invention has been described with respect to a limited number of embodiments, those skilled in the art will appreciate numerous modifications and variations therefrom. It is intended that the appended claims cover all such modifications and variations as fall within the true spirit and scope of this present invention.

What is claimed is:

1. A method comprising:
   monitoring available power from a power source, said power source to provide power to a computing system;
   predicting an overload condition of the power source based on the available power, said power source to disable itself upon the overload condition, predicting to include:
      determining a rate of present power consumption of the available power from said power source by the computing system,
      estimating a rate of decline for the available power, and
      projecting when the overload condition will occur based on the rate of decline for the available power; and
   initiating one or more power conserving tasks in the computing system prior to the predicted overload condition and prior to the computing system being shut down.

2. The method of claim 1, wherein:
   monitoring the available power comprises tracking power consumption by the computing system; and
   initiating the one or more power conserving tasks includes issuing a warning to the system in order to avoid the predicted overload condition.

3. The method of claim 1 wherein initiating the one or more power conserving tasks comprises:
   dynamically modifying a rate of present power consumption of the available power.

4. The method of claim 1 wherein monitoring the available power comprises:
   continuously sensing a real-time power transient in said power source.

5. A method comprising:
   providing a power delivery source to energize a processor-based device including one or more components, said power delivery source to disable itself upon an overload condition;
   tracking power consumption by said processor-based device against a predetermined power drain level to predict the overload condition, predict the overload condition to include:
      determining a rate of present power consumption of the available power from said power source by the computing system,
      estimating a rate of decline for the available power, and
      projecting when the overload condition will occur based on the rate of decline for the available power; and
   in response to the power consumption reaching the predetermined power drain level, performing at least one power conserving task, before the processor-based device is shut down, in order to adjust the power consumption for said processor-based device to at least temporarily avoid the predicted overload condition.

6. The method of claim 5, wherein tracking the power consumption comprises:
   monitoring a current and a voltage of the power delivery source;
   multiplying the current and the voltage to derive a power usage indication for the one or more components of said processor-based device; and
   comparing the power usage indication with the predetermined power drain level.

7. The method of claim 5 wherein performing the at least one power conserving task comprises:
   placing at least one component of said processor-based device into a lower-power consuming state with respect to other components before the power usage indication exceeds the predetermined power drain level.

8. The method of claim 5, wherein the processor-based device comprises a mobile device including a processor and a display.

9. An apparatus comprising:
   a power source with a battery threshold associated with an overload condition, said power source to disable itself upon the overload condition and said power source to energize a processor-based device including one or more components; and
   a monitor to track a power drain by said processor-based device against the battery threshold to predict the overload condition and initiate one or more power conserving tasks in the processor-based device before the predicted overload condition is reached and before the processor-based device is shut down, wherein to predict the overload condition includes:
      determining a rate of present power consumption of the available power from said power source by the processor-based device,
      estimating a rate of decline for the available power, and
      projecting when the overload condition will occur based on the rate of decline for the available power.

10. The apparatus of claim 9, wherein said monitor comprises:
a current monitor to sense the current at said power source;
a voltage monitor to sense the voltage at said power source;
a multiplier coupled to said current monitor and said voltage monitor to multiply the current and voltage to derive a power usage indication for the one or more components of said processor-based device; and
a comparator coupled to said multiplier to compare the power usage indication to the battery threshold.

11. The apparatus of claim 9, wherein said monitor comprises:
a memory to store a control logic to place the at least one component into a lower-power state with respect to other components of said processor-based device before the predicted overload condition.

12. The apparatus of claim 9 wherein the one or more components comprise a processor and a display, and wherein the one or more power conserving tasks comprise at least one of slowing down the processor or dimming the display.

13. A power delivery device to controllably energize a processor-based system including one or more components comprising:
a battery;
power supply circuitry to supply a DC power signal to said processor-based system from the battery, said battery to disable itself upon an overload condition; and
a battery overload protector operably coupled to both said power supply circuitry and said battery to predict the overload condition and initiate a selective deenergization of said one or more components of the processor-based system, wherein to predict the overload condition includes:
determining a rate of present power consumption of the available power from said power source by the processor-based system,
estimating a rate of decline for the available power, and
Projecting when the overload condition will occur based on the rate of decline for the available power.

14. The power delivery device of claim 13 wherein the power supply circuit comprises:
a voltage regulator.

15. The power delivery device of claim 13 wherein said battery overload protector to:
continuously sense a real-time power transient in said power supply circuitry and battery.

16. A system comprising:
a processor-based unit including one or more components; and
a power delivery unit operably couplable to said processor-based unit to deliver available power, said power delivery unit including:
battery,
power supply circuitry to supply a DC power signal to said processor-based system from the battery, said battery to disable itself upon an overload condition, and
a battery overload protector operably coupled to both said power supply circuitry and said battery to predict the overload condition and initiate a selective deenergization of said one or more components of the processor-based system, wherein to predict the overload condition includes:
determining a rate of present power consumption of the available power from said power delivery unit by said processor-based unit,
estimating a rate of decline for the available power; and
projecting when the overload condition will occur based on the rate of decline for the available power.

17. The system of claim 16 is a mobile system.

18. The system of claim 17, wherein said battery overload protector comprises:
a current-voltage monitor to sense a current and a voltage at said battery; and
a controller coupled to said current-voltage monitor to manage power distribution based on the current and sensed at said battery.

19. The system of claim 18, wherein said controller comprises a memory to store a control logic to estimate when the overload condition will occur for said battery, and to prepare said processor-based unit for a shutdown before the occurrence of said overload condition.

20. A machine readable medium having stored thereon machine executable instruction that when executed implement a method comprising:
monitoring available power from a power source, said power source to provide power to a computing system:
predicting an overload condition of the power source based on the available power, said power source to disable itself upon the overload condition, predicting to include:
determining a rate of present power consumption of the available power from said power source by the computing system,
estimating a rate of decline for the available power, and
projecting when the overload condition will occur based on the rate of decline for the available power; and
initiating one or more power conserving tasks in the computing system prior to the predicted overload condition and prior to the computing system being shut down.

21. The machine readable medium of claim 20 wherein:
monitoring the available power comprises tracking power consumption by the computing system; and
initiating the one or more power conserving tasks includes issuing a warning to the system in order to avoid the predicted overload condition.

22. The machine readable medium of claim 20 wherein initiating the one or more power conserving tasks comprises:
dynamically modifying a rate of present power consumption of the available power.

23. The machine readable medium of claim 20 monitoring the available power comprises:
continuously sensing a real-time power transient in said power source.

24. The method of claim 8, wherein performing the at least one power conserving task comprises slowing down the processor and dimming the display in the mobile device.

* * * * *